(12) United States Patent
Mukai

(10) Patent No.: US 9,886,761 B2
(45) Date of Patent: Feb. 6, 2018

(54) INFORMATION PROCESSING TO DISPLAY EXISTING POSITION OF OBJECT ON MAP

(71) Applicant: Sony Corporation, Tokyo (JP)

(72) Inventor: Hitoshi Mukai, Kanagawa (JP)

(73) Assignee: Sony Corporation, Tokyo (JP)

( * ) Notice: Subject to any disclaimer, the term of this patent is extended or adjusted under 35 U.S.C. 154(b) by 63 days.

(21) Appl. No.: 14/404,113

(22) PCT Filed: Jun. 6, 2013

(86) PCT No.: PCT/JP2013/065758
§ 371 (c)(1),
(2) Date: Nov. 26, 2014

(87) PCT Pub. No.: WO2013/183738
PCT Pub. Date: Dec. 12, 2013

(65) Prior Publication Data
US 2015/0170354 A1    Jun. 18, 2015

(30) Foreign Application Priority Data

Jun. 8, 2012    (JP) .................................. 2012-131202

(51) Int. Cl.
*G06K 9/00* (2006.01)
*G06T 7/00* (2017.01)
(Continued)

(52) U.S. Cl.
CPC .......... *G06T 7/004* (2013.01); *G06F 17/3079* (2013.01); *G06F 17/30811* (2013.01);
(Continued)

(58) Field of Classification Search
None
See application file for complete search history.

(56) References Cited

U.S. PATENT DOCUMENTS 6,816,184 B1 * 11/2004 Brill .................... G06K 9/00771
348/143
2003/0085992 A1 * 5/2003 Arpa ...................... G06T 15/205
348/47
(Continued)

FOREIGN PATENT DOCUMENTS

| JP | 11-049100 A | 2/1999 |
| JP | 2010-193170 A | 9/2010 |
| WO | WO 2009/110417 A1 | 9/2009 |

OTHER PUBLICATIONS

Girgensohn et al., "DOTS: Support for Effective Video Surveillance", In Proceedings of the 15th ACM international conference on Multimedia (MM '07), 2007, pp. 423-432.*

*Primary Examiner* — Matthew Bella
*Assistant Examiner* — Jose M Torres
(74) *Attorney, Agent, or Firm* — Chip Law Group

(57) ABSTRACT

In a system that displays the existing position of an object caught by a camera on a map, the load on a user are reduced, and user-friendliness is increased.
The position of an object in a camera image is converted into a position on a map with the use of conversion equations. The existing position of the object based on a result of the conversion is displayed on the map based on results of the conversion. The existence allowed region of the object on the map is set through a designation by the user. The parameters of the conversion equations are determined based on results of the conversion at respective times within a predetermined period of time and the set existence allowed region of the object so that trajectories of the object on the map fall within the existence allowed region.

10 Claims, 9 Drawing Sheets

(51) Int. Cl.
  *G06F 17/30*  (2006.01)
  *H04N 7/18*  (2006.01)
  *G06T 7/70*  (2017.01)
(52) U.S. Cl.
  CPC ............ *G06K 9/00771* (2013.01); *G06T 7/70* (2017.01); *H04N 7/188* (2013.01); *G06T 2207/10016* (2013.01); *G06T 2207/30196* (2013.01); *G06T 2207/30232* (2013.01); *G06T 2207/30241* (2013.01); *G06T 2207/30244* (2013.01)

(56) References Cited

U.S. PATENT DOCUMENTS

| | | | |
|---|---|---|---|
| 2005/0288911 A1* | 12/2005 | Porikli | G06K 9/00335 703/2 |
| 2006/0233461 A1* | 10/2006 | Ma | G06K 9/00624 382/285 |
| 2006/0279630 A1* | 12/2006 | Aggarwal | G01S 3/7864 348/143 |
| 2007/0285510 A1* | 12/2007 | Lipton | G08B 13/1961 348/135 |
| 2008/0088706 A1* | 4/2008 | Girgensohn | H04N 7/181 348/207.99 |
| 2008/0263592 A1* | 10/2008 | Kimber | G06F 3/0486 725/38 |
| 2009/0134968 A1* | 5/2009 | Girgensohn | G06K 9/00771 340/3.1 |
| 2010/0103266 A1* | 4/2010 | Merkel | G06T 7/0018 348/155 |
| 2013/0162838 A1* | 6/2013 | Huang | G06T 7/0042 348/169 |
| 2015/0116487 A1* | 4/2015 | Ptitsyn | H04N 5/23254 348/143 |

* cited by examiner $$\left(\frac{x_{lr} - x_{ul}}{2}, y_{lr}\right)$$

INFORMATION PROCESSING TO DISPLAY EXISTING POSITION OF OBJECT ON MAP

TECHNICAL FIELD

The present technique relates to information processing apparatuses, information processing methods, programs, and surveillance camera systems, and more particularly, to an information processing apparatus and the like that perform processes to display the existing position of an object caught by a camera on a map.

BACKGROUND ART

In recent years, a surveillance camera system has been developed to indicate the existing position of a human (an object) caught by a surveillance camera on a map displayed on the monitor of a personal computer (PC). This system aims to aid situation assessment of a security staff member who is monitoring images captured by surveillance cameras, so that humans existing in the images captured by the surveillance cameras can be immediately spotted on the map.

In this system, the position of a human in a camera image needs to be converted into a position on the map. To perform this conversion, a conversion equation (computation formula) for converting a position in a camera image into a position on a map is used. Prior to the use of this conversion equation, parameters of the conversion equation (camera parameters) need to be determined. For example, Patent Document 1 discloses a technique by which a user manually inputs information about dots in a camera image and the corresponding dots on a map, and parameters of the conversion equation are calculated based on the information.

CITATION LIST

Patent Document

Patent Document 1: JP 2010-193170 A

SUMMARY OF THE INVENTION

Problems to be Solved by the Invention

By the technique disclosed in Patent Document 1, however, a user has to take a lot of trouble in manually inputting a correspondence relationship for each surveillance camera.

The present technique aims to reduce the load on a user and increase user-friendliness.

Solutions to Problems

The concept of the present technique lies in an information processing apparatus that includes: a converting unit that converts a position of an object in a camera image into a position on a map by using a conversion equation; a display unit that displays the existing position of the object on the map based on results of the conversion; a region setting unit that sets an existence allowed region of the object on the map; and a parameter determining unit that determines a parameter of the conversion equation based on the results of the conversion at respective times within a predetermined period of time and the set existence allowed region of the object so that a trajectory of the object on the map falls within the existence allowed region.

In the present technique, the converting unit converts a position of an object such as a human in a camera image into a position on a map by using a conversion equation. Based on a result of the conversion, the display unit displays the existing position of the object on the map. In this case, an icon representing the object is displayed at the existing position of the object on the map, for example.

The region setting unit sets the existence allowed region of the object on the map. This setting is performed based on a user's designation of a region where the object can exist on the map, for example. The parameter determining unit determines the parameter of the conversion equation. Specifically, the parameter of the conversion equation is determined based on results of the conversion at respective times within a predetermined period of time and the set existence allowed region of the object so that trajectories of the object on the map fall within the existence allowed region.

If there is more than one object in this case, the parameter determining unit determines and uses a trajectory of each of the objects on the map, for example. In this case, the object is a human, for example, and the information processing apparatus further includes a human extracting unit that extracts the human from the camera image and obtains a position of the human. Also, the information processing apparatus further includes an initial value setting unit that sets an initial value of the parameter of the conversion equation based on a user input value and a fixed value, for example.

As described above, in the present technique, the parameter of the conversion equation is determined so that a trajectory of the object on the map falls within the existence allowed region according to a user designation. Accordingly, the parameter of the conversion equation can be determined, with a smaller load being put on the user. Thus, the load on the user can be reduced, and user-friendliness can be increased.

In the present technique, the parameter determining unit may determine the parameter of the conversion equation based on a result of the conversion during the latest certain period and the set existence allowed region of the object at regular time intervals, for example. In this case, the parameter of the conversion equation can be updated to achieve even better camera parameters at regular time intervals, and temporal changes due to some factors can be dealt with.

Also, in the present technique, the parameter determining unit may determine the parameter of the conversion equation so that a trajectory of the object on the map is located further away from a boundary of the set existence allowed region of the object, for example. Accordingly, the parameter of the conversion equation can be further optimized.

Also, in the present technique, the parameter determining unit may determine the parameter of the conversion equation so that the moving speed of the object on the map becomes constant, for example. Accordingly, the parameter of the conversion equation can be further optimized.

Effects of the Invention

According to the present technique, the load on a user can be reduced, and user-friendliness can be increased.

MODES FOR CARRYING OUT THE INVENTION

The following is a mode for carrying out the invention (hereinafter referred to as the "embodiment"). Explanation will be made in the following order.
1. Embodiment
2. Modifications

1. Embodiment

[Example Configuration of a Surveillance Camera System]

Figure 1:
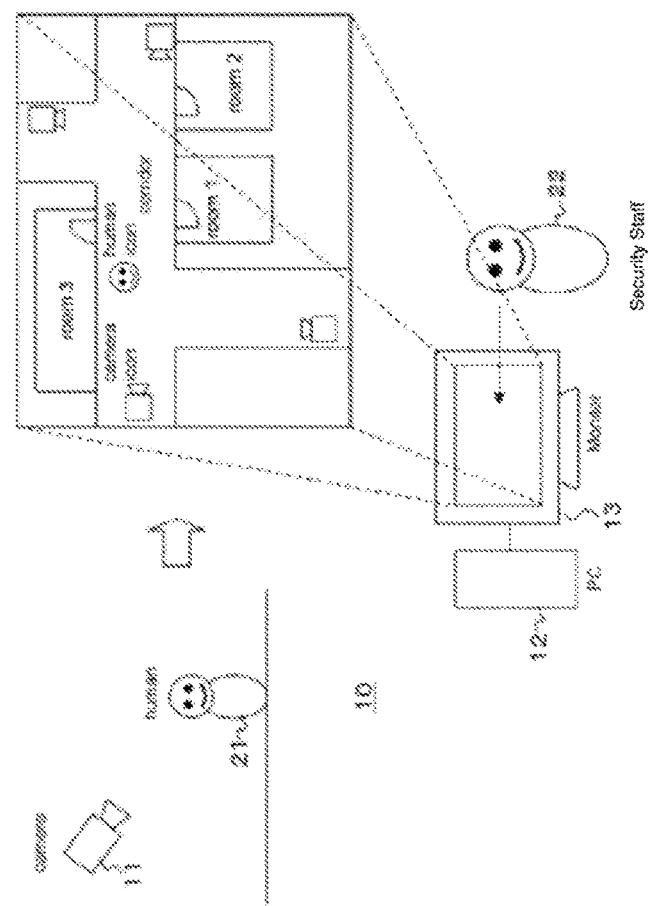
FIG. 1 is a block diagram showing an example configuration of a surveillance camera system as an embodiment.

FIG. 1 shows an example of a surveillance camera system 10 as an embodiment. This surveillance camera system 10 includes a surveillance camera 11, a personal computer (PC) 12 as an information processing apparatus that processes images captured by the surveillance camera 11, and a monitor 13.

This surveillance camera system 10 is a system that indicates the position at which a human 21 caught by the surveillance camera 11 is located on a map displayed on the monitor 13. This surveillance camera system 10 is designed to aid situation assessment of a security staff member 22 who is monitoring images captured by the surveillance camera 11, and enables the security staff member 22 to visually recognize where on the map the human 21 caught by the surveillance camera 11 is located.

Here, the map is a diagram of the space in which the surveillance camera 11 is installed, seen from above, for example. In this embodiment, this map is a floor plan of the building in which the surveillance camera 11 is installed, as shown in the drawing. This map shows a camera icon corresponding to the installation position of the surveillance camera 11, and a human icon corresponding to the existing position of the human 21.

The personal computer (hereinafter referred to simply as the "computer") 12 calculates the position of the human 21 on the map from the position of the human 21 in a camera image captured by the surveillance camera 11. The mathematical formulas (1) and (2) shown below are formulas for calculating a position (u, v) on the map from the position (x, y) of the human 21 in the camera image.

[Mathematical Formula 1]

$$u = g_u(X, Y, Z, \theta, \varphi, \eta, f, s, W, H, x, y) \quad (1)$$

$$v = g_v(X, Y, Z, \theta, \varphi, \eta, f, s, W, H, x, y) \quad (2)$$

Figure 2:
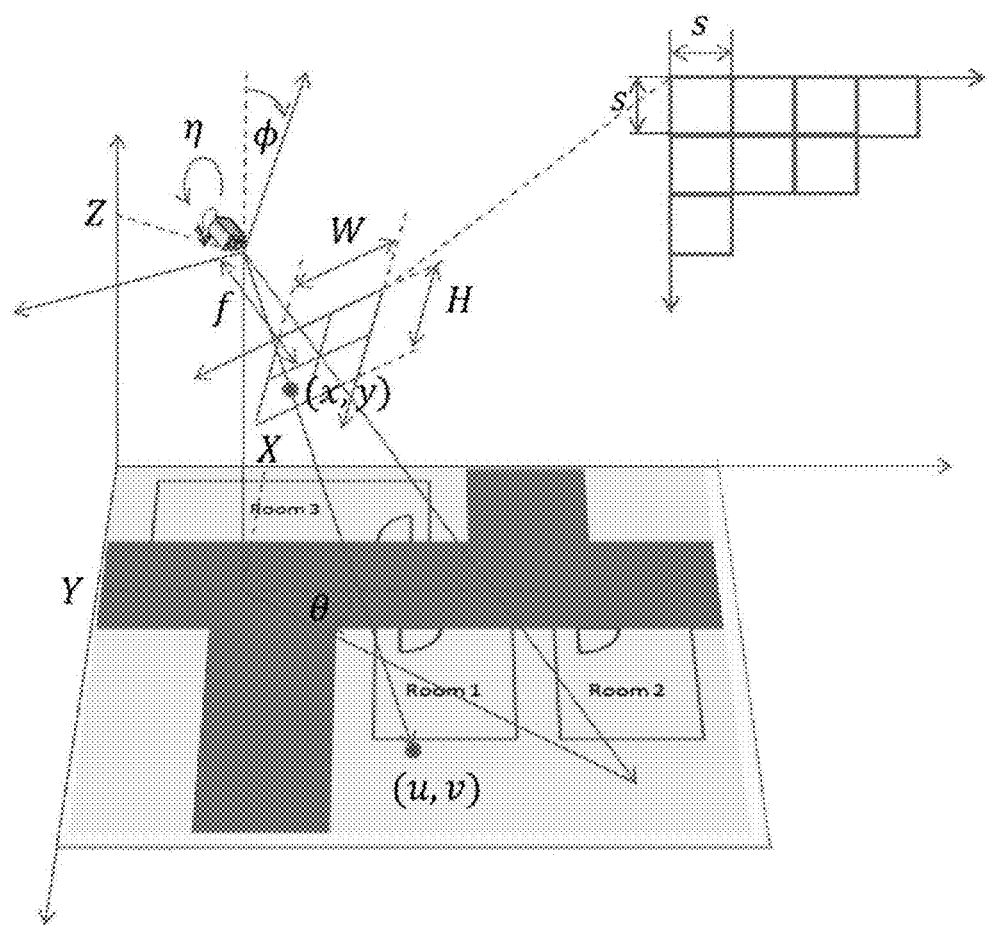
FIG. 2 is a diagram for explaining parameters (camera parameters) included in conversion equations.

In the formulas, u and v are functions of the three-dimensional position (X, Y, Z) of the focal point of the camera, the three-dimensional orientation ($\theta$, $\varphi$, $\eta$) of the camera, the focal length f, the length s [mm/pixel] of one pixel of the camera image, the width and height (W, H), and the position (x, y) of the human in the camera image (see FIG. 2). The mathematical formula (3) shown below expresses a specific example of a function form. However, this example is merely an example, and the present technique is not limited to this example.

[Mathematical Formula 2]

$$\begin{bmatrix} U \\ V \\ A \end{bmatrix} = \begin{bmatrix} 0 & 0 & 1 \\ 1 & 0 & 0 \\ 0 & 1 & 0 \end{bmatrix} \begin{bmatrix} \cos\theta & 0 & \sin\theta \\ 0 & 1 & 0 \\ -\sin\theta & 0 & \cos\theta \end{bmatrix} \begin{bmatrix} 1 & 0 & 0 \\ 0 & \cos\phi & -\sin\phi \\ 0 & \sin\phi & \cos\phi \end{bmatrix} \quad (3)$$

$$\begin{bmatrix} \cos\eta & \sin\eta & 0 \\ -\sin\eta & \cos\eta & 0 \\ 0 & 0 & 1 \end{bmatrix} \begin{bmatrix} \frac{1}{fs} & 0 & -\frac{W}{2f} \\ 0 & -\frac{1}{fs} & \frac{H}{2f} \\ 0 & 0 & 1 \end{bmatrix} \begin{bmatrix} x \\ y \\ 1 \end{bmatrix} + \begin{bmatrix} X \\ Y \\ Z \end{bmatrix}$$

$$u = \frac{U}{A}$$

$$v = \frac{V}{A}$$

In this function, (W, H) are known amounts, and (X, Y, Z, $\theta$, $\varphi$, $\eta$, f, s) are variables that are determined by installed conditions of the camera. The eight variables are parameters in the conversion equations, and will be hereinafter referred to as the "camera parameters". That is, so as to calculate the position (u, v) of the human 21 on the map from the position (x, y) of the human 21 in a camera image captured by the surveillance camera 11, the personal computer 12 performs a process to determine the camera parameters at regular time intervals.

Figure 3:
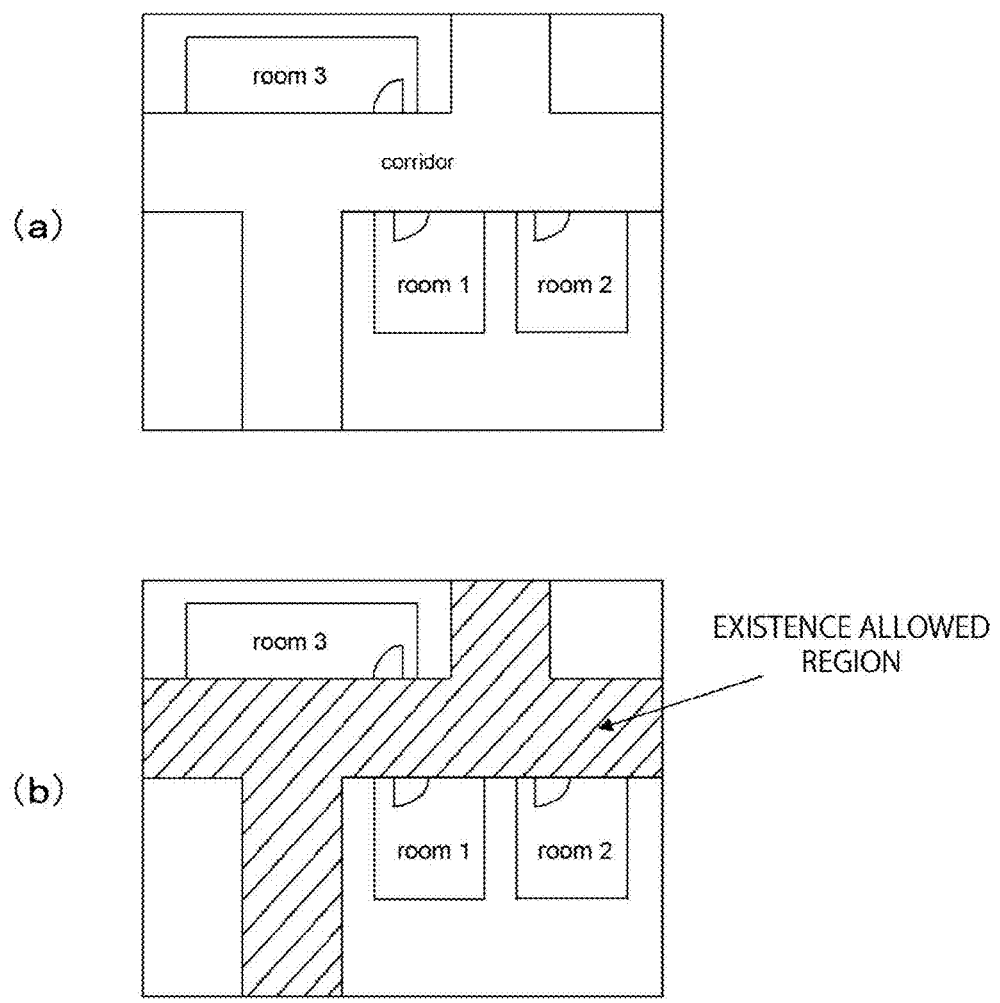
FIG. 3 is a diagram for explaining that a user designates beforehand an existence allowed region of a human on a map.

The feature of the present technique lies in making a user designate beforehand an existence allowed region of the human 21 on the map. Specifically, in a case where a floor plan of an office shown in FIG. 3(a) is the map, for example, a user is made to designate beforehand a range that can be seen from the camera and a region where a human can exist, or the corridor region in this example, as shown in FIG. 3(b). In FIG. 3(b), the shaded region is the region. In this example, the inside of each room cannot be seen from the camera, and therefore, is not included in the region. The user designates the region by using a drawing tool or the like.

Figure 4:
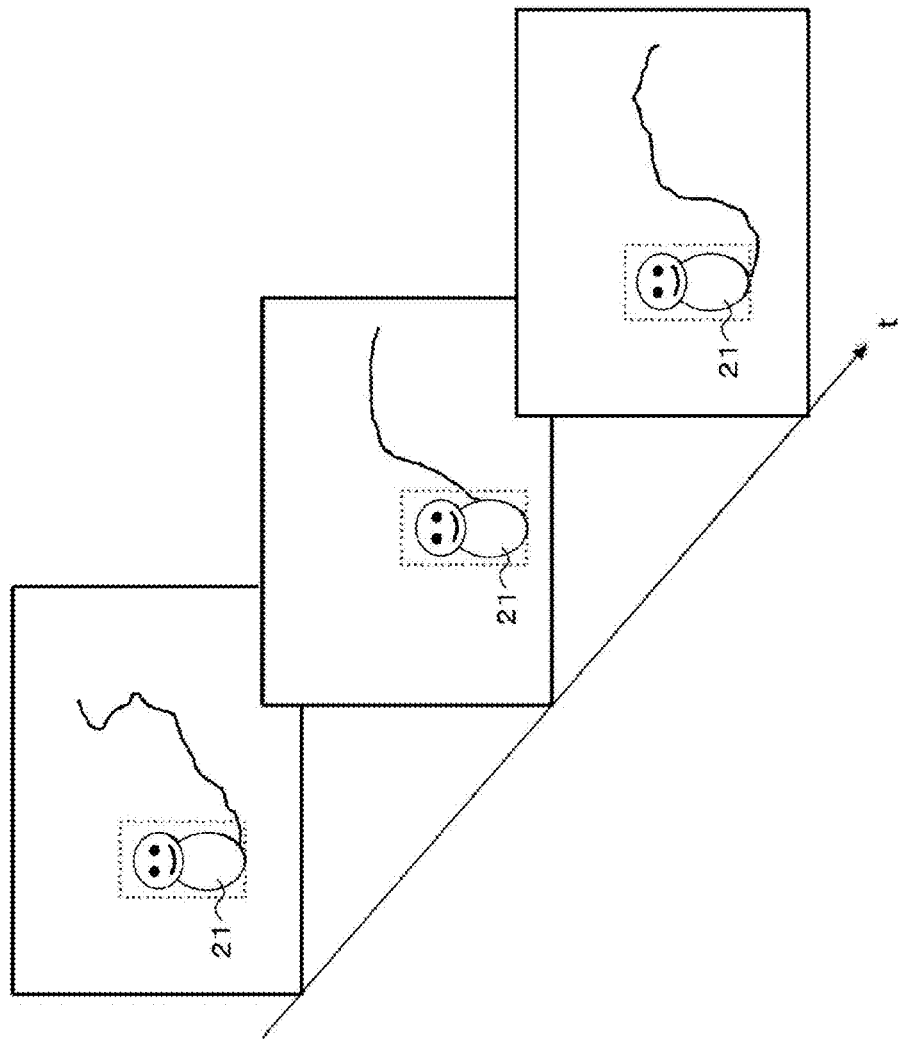
FIG. 4 is a diagram for explaining that a human is detected from camera images of different times, and the detected positions are sequentially recorded.

Meanwhile, trajectories of the human caught by the camera in the past in camera images can be acquired by detecting the human 21 from camera images of different times and sequentially recording the detected positions, as shown in FIG. 4. The present technique is to determine camera parameters from information about the existence allowed region of a human and information about the past trajectories of the human.

Figure 5:
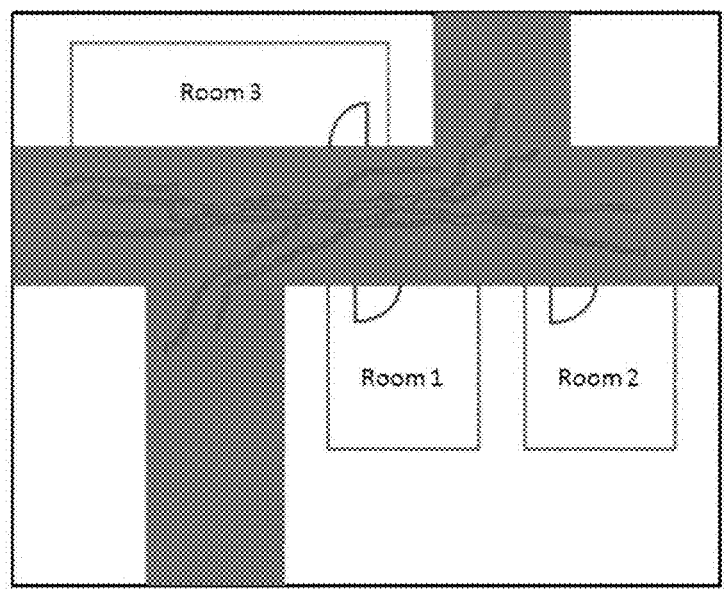
FIG. 5 is a diagram showing that all converted trajectories fall within the human existence allowed region if the parameters are correct.
Figure 6:
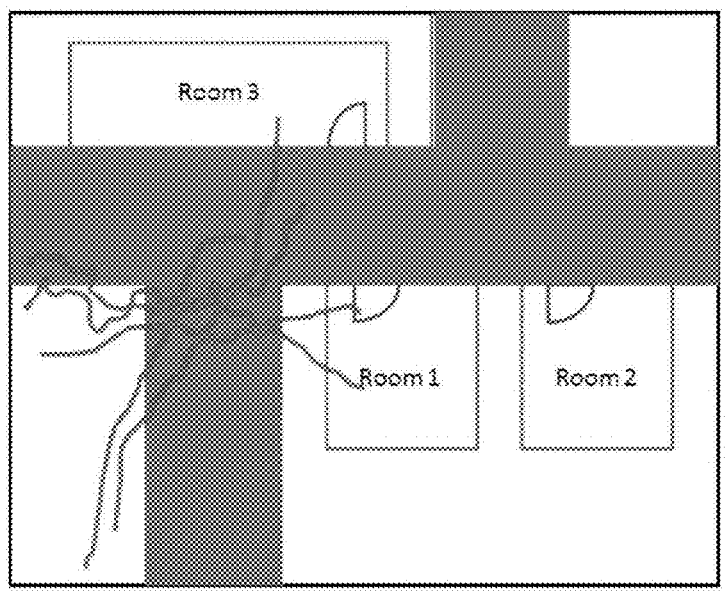
FIG. 6 is a diagram showing that converted trajectories partially fall outside the human existence allowed region if the parameters are not correct.

When the trajectories of a human in camera images are converted into trajectories on a map by using the camera parameters, all the converted trajectories should fall within the existence allowed region of the human as shown in FIG. 5 if the used parameters are correct. If the used parameters are not correct, the converted trajectories will partially fall outside the existence allowed region of the human as shown in FIG. 6. According to the present technique, the camera parameters are determined by quantifying the degree of existence and the degree of nonexistence in the human existence allowed region, and forming evaluation functions.

Figure 7:
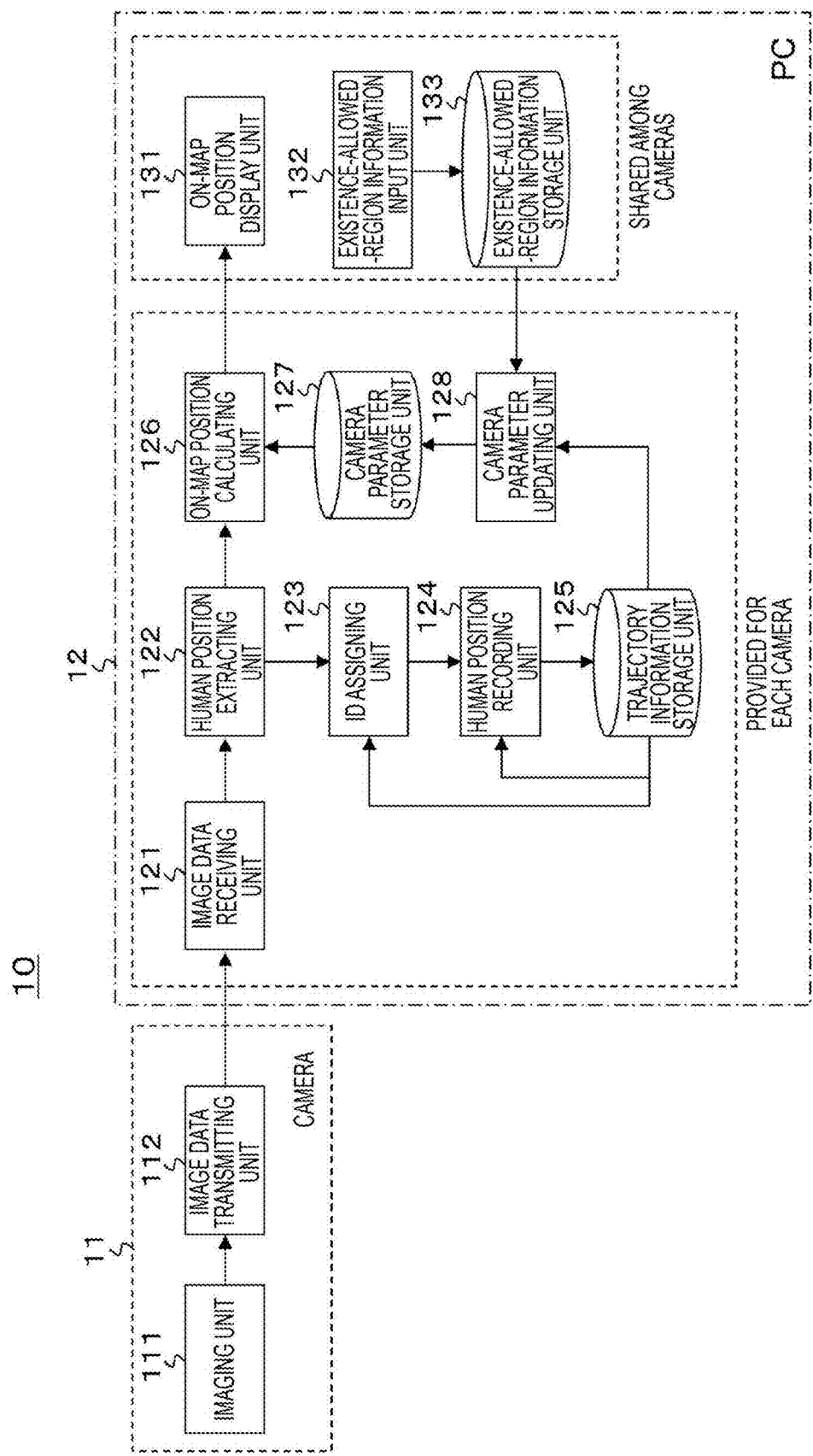
FIG. 7 is a functional block diagram of the surveillance camera and the computer that constitute the surveillance camera system.

FIG. 7 is a functional block diagram of the surveillance camera 11 and the computer 12 that constitute the surveillance camera system 10 shown in FIG. 1. The surveillance camera 11 includes an imaging unit 111 and an image data transmitting unit 112. The imaging unit 111 is formed with a CMOS image sensor, a CCD image sensor, or the like, and obtains captured images. The image data transmitting unit 112 transmits captured images (camera images) to the computer 12 as an information processing apparatus in a wired or wireless manner.

The computer 12 includes an image data receiving unit 121, a human position extracting unit 122, an ID assigning unit 123, a human position recording unit 124, a trajectory information storage unit 125, an on-map position calculating unit 126, a camera parameter storage unit 127, and a camera parameter updating unit 128. These components are provided for each camera.

The computer 12 also includes an on-map position display unit 131, an existence-allowed-region information input unit 132, and an existence-allowed-region information storage unit 133. These components are shared among cameras.

The image data receiving unit 121 receives a captured image (camera image) transmitted from the surveillance camera 11. The human position extracting unit 122 extracts the in-image position (x, y) of the human captured in the camera image. The ID assigning unit 123 assigns an ID (serial number) for the human to the extracted position of the human. The human position recording unit 124 records information about the human position to which the ID is assigned in the trajectory information storage unit 125. Here, information about the human positions having the same ID is collectively referred to as "trajectories".

The camera parameter updating unit 128 determines and updates camera parameters at regular time intervals based on the respective trajectories stored in the trajectory information storage unit 125 and the information about the existence allowed region of the human 21. The camera parameter storage unit 127 stores the camera parameters updated at regular time intervals. The on-map position calculating unit 126 calculates the on-map position (u, v) from the extracted human position (x, y), using the stored parameters of the conversion equations.

The on-map position display unit 131 indicates the existence of the human 21 at the calculated on-map position (u, v) on the map displayed on the screen of the monitor 13. For example, the icon representing the human 21 is displayed at the on-map position (u, v). The existence-region information input unit 132 is an input unit for a user to designate a region where the human 21 can exist on the map. The existence allowed region of the human 21 is set based on the user designation, and the existence-allowed-region information storage unit 133 stores the information about the existence allowed region.

Figure 8:
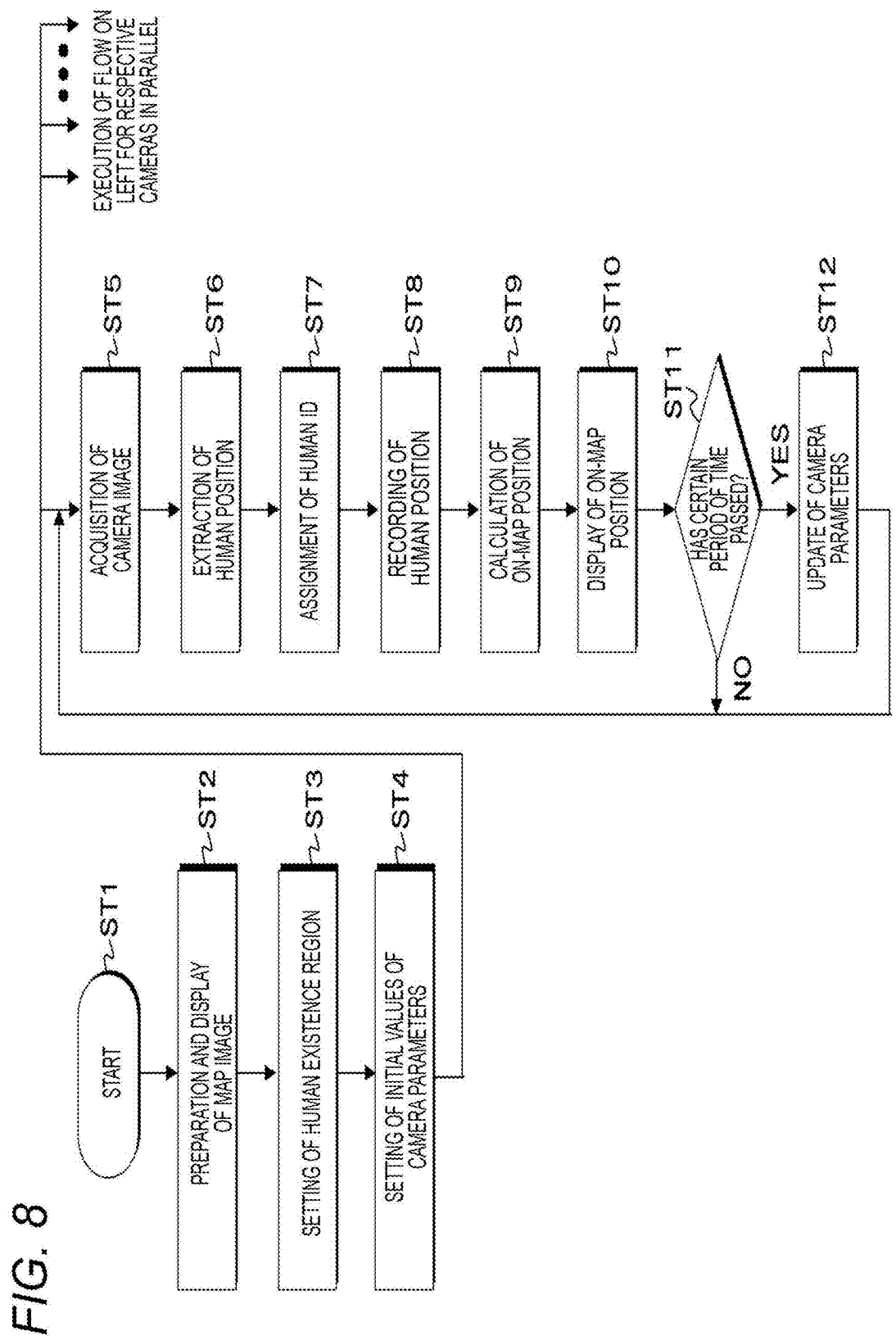
FIG. 8 is a flowchart showing an example operation of the computer of the surveillance camera system.

Operation of the computer 12 of the surveillance camera system 10 shown in FIG. 1 is now described with reference to the flowchart shown in FIG. 8. The procedures of steps ST5 through ST12 are carried out for the respective cameras in parallel.

First, in step ST1, the computer 12 starts operating. In step ST2, the computer 12 prepares the image data of a map (a plan seen from above) of the area where the surveillance camera 11 is installed, and displays the image data on the screen of the monitor 13. In step ST3, the computer 12 sets a range that can be seen from the surveillance camera on the map and a region where a human can exist (the existence allowed region). The computer 12 performs the setting based on a region designation input from the user.

In step ST4, the computer 12 sets initial values of the camera parameters. For each camera, an approximate position of the camera on the map, an installation height, an orientation of the camera, a depression angle, a rotation angle, and a scale are set in this case. The positions of the cameras on the map and the orientations of the cameras vary from one camera to another. Meanwhile, values that are general to the respective cameras may be assigned as fixed values beforehand to the other parameters.

In step ST5, the computer 12 acquires a camera image (captured image). If the camera image shows the human 21, the computer 12 in step ST6 extracts the position (x, y) of the human 21 in the image. If more than one human 21 exists, the positions of all the humans 21 are determined.

Figure 9:
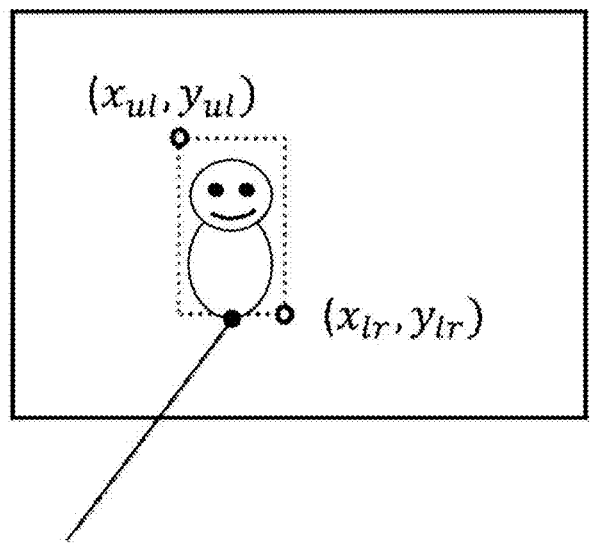
FIG. 9 is a diagram for explaining that the position of a human indicates the position of the feet of the human.

Here, the position is the position of the feet of the human 21. For example, in a case where a result of human extraction is represented by a rectangle as shown in FIG. 9, x and y are values expressed in the mathematical formulas (4) and (5) shown below, where (xul, yul) represent the position of the upper left corner of the rectangle in the camera image, and (xlr, ylr) represent the position of the lower right corner of the rectangle in the camera image.

$$x=(xlr-xul)/2 \quad (4)$$

$$y=ylr \quad (5)$$

The method of extracting a human may be one of various methods, such as a method using background differences, and a method of extracting a human by detecting features of the human that have been learned in advance. As long as sufficient accuracy is achieved, any method may be used.

A method using background differences is disclosed in the non-patent document, "Adaptive background mixture models for real-time tracking, C. Stauffer and W. E. L. Grimson, Computer Vision and Pattern Recognition, 1999", for example. A method of extracting a human by detecting features of the human that have been learned in advance is disclosed in the non-patent document, "Histograms of Oriented Gradients for Human Detection, N. Dalal and B. Triggs, Computer Vision and Pattern Recognition, 2005", for example.

In step ST7, the computer 12 assigns a human ID. Specifically, the computer 12 assigns an ID (serial number) to the human position extracted in step ST6. For example, if the number of extracted human positions is one immediately after the start of the process, the number "1" is assigned. If the number of extracted human positions is three immediately after the start of the process, the numbers "1", "2", and "3" are assigned.

In short, the ID assignment is tracking. The ID assignment is performed so that the positions of the same human at different times can be collectively handled as a trajectory of the human in a later step. Specifically, in a case where the human positions extracted last time include a position of a human who is considered to be the same human as the human having his/her position extracted from the camera image of the current time, the same ID as the ID assigned to the position of the human last time is assigned to the position of the human this time.

In this case, for each of the human positions extracted from the camera image of the current time, the following procedures are carried out, for example. (1) In a case where the number of human positions extracted from the image of the last time is zero, a new number that has not been assigned (or has not been used) is assigned as the ID to the current human position. The assignment process ends at this point, and any further steps are not carried out.

(2) In a case where the number of the human positions extracted from the image of the last time is not zero, the Euclidean distances between the respective human positions and the human position extracted from the image of the current time is calculated in a camera image. (3) The smallest value is selected from among the calculated distances.

(4) If the smallest value is smaller than a threshold value that is set in advance, the same ID as the ID assigned to the human position that is from the last time and is at the shortest distance is assigned to the current human position. The assignment process ends at this point, and any further steps are not carried out. (5) If the smallest value is larger than the preset threshold value, a new number that has not been assigned (or has not been used) is assigned as the ID to the current human position.

In step ST8, the computer 12 records information about the extracted human position (x, y), together with time and the ID, on the hard disk or the like of the computer 12. Hereinafter, information about the human positions having the same ID will be collectively referred to as "trajectories".

In step ST9, the computer 12 calculates the position (u, v) of the human 21 on the map from the position (x, y) of the human 21 in the camera image, using the above mentioned conversion equations (see the mathematical formulas (1) and (2)). In a case where more than one human position is detected, calculations are performed for the respective detected human positions independently of one another.

Figure 10:
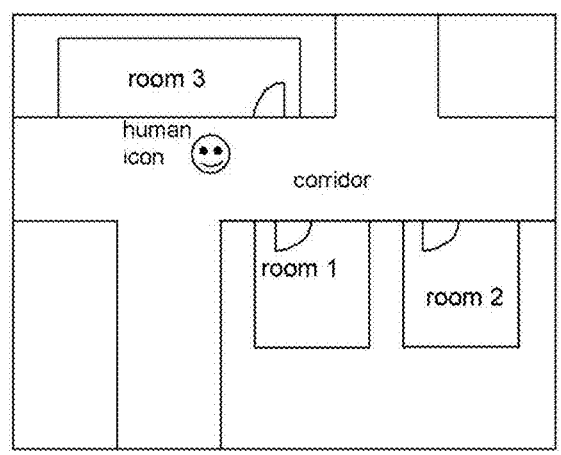
FIG. 10 is a diagram showing an example of display of the position of a human on a map.

In step ST10, the computer 12 displays a human-shaped icon representing the human at the corresponding position on the map image based on the calculated position of the human 21 on the map, as shown in FIG. 10.

In step ST11, the computer 12 determines whether a certain period of time has passed since a camera parameter update process was performed last time. Here, the certain period of time is an amount that is set beforehand, and may be a period of time such as half a day, one day, or one week.

If the certain period of time has not passed yet, the computer 12 returns to the procedure of step ST5, and repeats the above described process for each frame or each set of frames, for example, at regular time intervals. If the certain period of time has passed, on the other hand, the computer 12 in step ST12 performs a camera parameter update process, and then returns to the procedure of step ST5.

The camera parameter update process is now described. The camera parameters are $H=[X, Y, Z, \theta, \varphi, \eta, f, s]^T$. The number of trajectories of human positions accumulated in a certain period of time is represented by M. Of the M trajectories, the ith trajectory data is represented by Pi.

The camera parameter update process is a process to determine the camera parameters that maximize the value expressed in the mathematical formula (6) shown below, and replace the current camera parameters with the newly determined camera parameters.

[Mathematical Formula 3]

$$p(H) \cdot \prod_{i=1}^{M} p(Pi|H) \qquad (6)$$

Here, the computer 12 determines the camera parameters that maximize the value expressed in the mathematical formula (6), using a general optimization method such as the steepest descent method (the hill climbing method), the quasi-Newton's method, or the Levenberg-Marquardt method.

Figure 11:
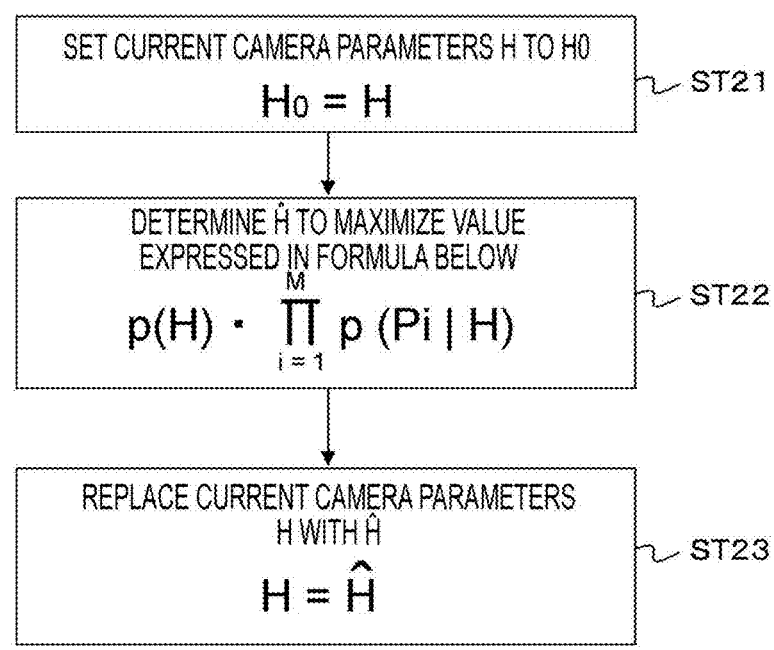
FIG. 11 is a flowchart showing the procedures in a camera parameter update process.

The flowchart in FIG. 11 shows the procedures in the camera parameter update process. First, in step ST21, the computer 12 sets the current camera parameters H to $H_0$. In step ST22, the computer 12 determines the camera parameters H (hat) that maximize the value expressed in the above mathematical formula (6). In step ST23, the computer 12 replaces the current camera parameters H with H (hat) determined in step ST22.

The computer 12 calculates p(H) in the above mathematical formula (6) as shown in the mathematical formula (7) shown below.

$$p(H)=N(X_0,\sigma_X^2) \cdot N(Y_0,\sigma_Y^2) \cdot N(Z_0,\sigma_Z^2) \cdot N(\theta_0,\sigma_\theta^2) \cdot N(\varphi_0, \sigma_\varphi^2) \cdot N(\eta_0,\sigma_\eta^2) \cdot N(f_0,\sigma_f^2) \cdot N(s_0,\sigma_s^2) \qquad (7)$$

Here, $N(\mu, \sigma^2)$ represents the normal distributions of the mean value $\mu$ and the variance $\sigma^2$. The subscript "0" indicates the current camera parameters $H_0=[X_0, Y_0, Z_0, \theta_0, \varphi_0, \eta_0, f_0, s_0]^T$ prior to update. That is, p(H) is a function of $H_0$. For example, $N(X_0, \sigma_X^2)$ is expressed in the mathematical formula (8) shown below.

[Mathematical Formula 4]

$$N(X0, \sigma_x^2) = \frac{1}{\sqrt{2\pi\sigma_x^2}} e^{-\frac{(X-X_0)^2}{2\sigma_x^2}} \qquad (8)$$

The variances ($\sigma_X^2, \sigma_Y^2, \sigma_Z^2, \sigma_\theta^2, \sigma_\varphi^2, \sigma_\eta^2, \sigma_f^2, \sigma_s^2$) of the respective parameters are set beforehand by taking into account the respective features (such as general variations in camera position inputs from the user for (X, Y, Z), or a general range of the surveillance camera for the depression angle ($\varphi$) or the rotation angle ($\eta$)).

The computer 12 calculates p(Pi|H) in the above mathematical formula (6) as shown in the mathematical formula (9) shown below.

$$p(Pi|H)=E_1(Pi,H) \cdot E_2(Pi,H) \qquad (9)$$

$E_1(Pi, H)$ is a function to evaluate the degree of existence of the trajectory Pi in the human existence allowed region, and is calculated as shown in the mathematical formula (10) shown below.

[Mathematical Formula 5]

$$E_1(Pi, H) = \sum_{j=1}^{L} f_1(g_u(H, W, H, x_j^i, y_j^i), g_v(H, W, H, x_j^i, y_j^i)) \qquad (10)$$

$$f_1(u, v) = \begin{cases} d_{min} & \text{(where } (u, v) \text{ is within the humanexistence allowed region)} \\ -d_{min} & \text{(where } (u, v) \text{ is outside the humanexistence allowed region)} \end{cases}$$

(where (u, v) is within the human existence allowed region)
(where (u, v) is outside the human existence allowed region)

Figure 12:
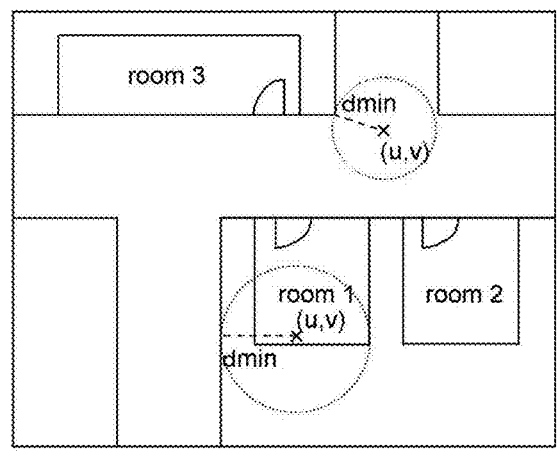
FIG. 12 is a diagram for explaining functions to evaluate the degree of existence of a trajectory Pi in the human existence allowed region.

Here, L represents the total number of dots (human positions) constituting the ith trajectory. ($x^i_j$, $y^i_j$) represent the coordinate values of the human position at the jth time in the ith trajectory. Further, $d_{min}$ represents the shortest distance between the point (u, v) and the boundary of the human existence allowed region, as shown in FIG. 12.

Accordingly, $E_1$(Pi, H) gives a higher evaluation to a trajectory located further inside the human existence allowed region. This is based on the assumption that a human walks in the middle of a corridor more often than on a side of a corridor.

$E_2$(Pi, H) is a function to evaluate the degree of steadiness of the walking speed in the trajectory Pi, and gives a higher evaluation value when the intervals between the adjacent dots constituting the trajectory are more uniform. This $E_2$(Pi, H) is calculated as shown in the mathematical formula (11) shown below. In this case, the variance among the distance between the adjacent dots is calculated. This is based on the assumption that the walking speed of a human is normally almost constant and rarely varies.

[Mathematical Formula 6]

$$\frac{1}{E_2(Pi, H)} = \frac{1}{L-1}\sum_{j=1}^{L-1}D(u^i_j, v^i_j, u^i_{j+1}, v^i_{j+1})^2 - \left(\frac{1}{L-1}\sum_{j=1}^{L-1}D(u^i_j, v^i_j, u^i_{j+1}, v^i_{j+1})\right)^2 \quad (11)$$

$$\begin{cases} u^i_j = g_u(H, W, H, x^i_j, y^i_j) \\ v^i_j = g_v(H, W, H, x^i_j, y^i_j) \\ D(u_1, v_1, u_2, v_2) = \sqrt{(u_2 - u_1)^2 + (v_2 - v_1)^2} \end{cases}$$

It should be noted that the specific method of calculating p(Pi|H) is not limited to the above described evaluations. Other evaluation criteria may be added. For example, the computer 12 can also calculate p(Pi|H) by adding $E_3$(Pi, H), as shown in the mathematical formula (12) shown below.

$$p(Pi|H)=E_1(Pi,H)\cdot E_2(Pi,H)\cdot E_3(Pi,H) \quad (12)$$

Instead of the above mathematical formula (6), the mathematical formula (13) shown below may be used.

[Mathematical Formula 7]

$$p(H) = \sum_{j=1}^{N} f_1(g_u(H, W, H, x^i_j, y^i_j), g_v(H, W, H, x^i_j, y^i_j)) \quad (13)$$

Here, N represents the total number of human positions accumulated in a certain period of time, and xj and yj represent the coordinates of the jth position among the accumulated positions. Unlike the mathematical formula (6), the mathematical formula (13) allows a small margin of error in extracting a human position. The mathematical formula (13) does not involve any evaluation of a walking speed.

Where the mathematical formula (13) is used, evaluations are simpler than those in a case where the mathematical formula (6) is used. However, implementation is made easier, and processing is made simpler with the mathematical formula (13). This is because, the mathematical formula (13) requires only the information about the positions of the human extracted at respective times in a certain period in the past, and does not require any "trajectory". That is, the human ID assignment in step ST7 in the flowchart shown in FIG. 8 is not necessary. Accordingly, implementation becomes easier, and processing becomes simpler.

As described above, in the surveillance camera system 10 shown in FIG. 1, the camera parameters (parameters in conversion equations) are determined so that the positions (trajectories) of a human on a map fall within an existence allowed region according to a user designation. That is, the user only has to designate the existence allowed region, and determining the camera parameters puts a smaller load on the user. Accordingly, the load on the user can be reduced, and user-friendliness can be increased.

Also, in the surveillance camera system 10 shown in FIG. 1, the camera parameters are determined and updated based on a result of the latest conversion during a certain period of time and a set human existence allowed region at regular time intervals. Accordingly, the camera parameters can be updated to achieve even better camera parameters at regular time intervals, and temporal changes due to some factors can be dealt with.

Also, in the surveillance camera system 10 shown in FIG. 1, the camera parameters are determined so that the positions (trajectories) of a human on a map are located further away from a boundary of the set object existence allowed region. Accordingly, even better camera parameters can be determined.

Also, in a case where the mathematical formula (6) is used in the surveillance camera system 10 shown in FIG. 1, the parameters in the conversion equations can be determined so that the moving speed of a human on a map becomes constant. Accordingly, even better camera parameters can be determined.

2. Modifications

Although the object is a human in the above described embodiment, the surveillance object is not limited to a human. The object may be any animal other than humans, or may be a moving object such as a vehicle, a motorcycle, and a bicycle.

Also, in the above described embodiment, the surveillance camera 11 is installed in a building. However, the present technique can also be applied to a surveillance camera system that has the surveillance camera 11 installed in an urban area. In that case, a map is a top view of the urban area where the surveillance camera 11 is installed.

The present technique may also be embodied in the structures described below.

(1) An information processing apparatus including:
a converting unit that converts a position of an object in a camera image into a position on a map by using a conversion equation;
a display unit that displays the existing position of the object on the map based on results of the conversion;
a region setting unit that sets an existence allowed region of the object on the map; and
a parameter determining unit that determines a parameter of the conversion equation based on the results of the conversion at respective times within a predetermined period of time and the set existence allowed region of the object so that a trajectory of the object on the map falls within the existence allowed region.

(2) The information processing apparatus of (1), wherein the parameter determining unit determines the parameter of the conversion equation based on a result of the conversion during the latest certain period and the set existence allowed region of the object at regular time intervals.

(3) The information processing apparatus of (1) or (2), wherein the parameter determining unit determines the parameter of the conversion equation so that a trajectory of the object on the map is located further away from a boundary of the set existence allowed region of the object.

(4) The information processing apparatus of any one of (1) through (3), wherein the parameter determining unit determines the parameter of the conversion equation so that a moving speed of the object on the map becomes constant.

(5) The information processing apparatus of any one of (1) through (4), wherein, when more than one object exists, the parameter determining unit determines and uses a trajectory of each of the objects on the map.

(6) The information processing apparatus of any one of (1) through (5), wherein
the object is a human, and
the information processing apparatus further includes a human extracting unit that extracts the human from the camera image and obtains a position of the human.

(7) The information processing apparatus of any one of (1) through (6), further including an initial value setting unit that sets an initial value of the parameter of the conversion equation based on a user input value and a fixed value.

(8) An information processing method including:
a converting step of converting a position of an object in a camera image into a position on a map by using a conversion equation;
a display step of displaying the existing position of the object on the map based on results of the conversion;
a region setting step of setting an existence allowed region of the object on the map; and
a parameter determining step of determining a parameter of the conversion equation based on the results of the conversion at respective times within a predetermined period of time and the set existence allowed region of the object so that a trajectory of the object on the map falls within the existence allowed region.

(9) A program for causing a computer to function as:
conversion means to convert a position of an object in a camera image into a position on a map by using a conversion equation;
display means to display the existing position of the object on the map based on results of the conversion;
region setting means to set an existence allowed region of the object on the map; and
parameter determination means to determine a parameter of the conversion equation based on the results of the conversion at respective times within a predetermined period of time and the set existence allowed region of the object so that a trajectory of the object on the map falls within the existence allowed region.

(10) A surveillance camera system including:
a surveillance camera; and
an information processing apparatus that processes an image captured by the surveillance camera, the information processing apparatus including:
a converting unit that converts a position of an object in a camera image into a position on a map by using a conversion equation;
a display unit that displays the existing position of the object on the map based on results of the conversion;
a region setting unit that sets an existence allowed region of the object on the map; and
a parameter determining unit that determines a parameter of the conversion equation based on the results of the conversion at respective times within a predetermined period of time and the set existence allowed region of the object so that a trajectory of the object on the map falls within the existence allowed region.

REFERENCE SIGNS LIST

10 Surveillance camera system
11 Surveillance camera
12 Personal computer
13 Monitor
21 Human
22 Security staff member
111 Imaging unit
112 Image data transmitting unit
121 Image data receiving unit
122 Human position extracting unit
123 ID assigning unit
124 Human position recording unit
125 Trajectory information storage unit
126 On-map position calculating unit
127 Camera parameter storage unit
128 Camera parameter updating unit
131 On-map position display unit
132 Existence-allowed-region information input unit
133 Existence-allowed-region information storage unit

The invention claimed is:
1. An information processing apparatus, comprising:
circuitry configured to:
convert a position of an object in an image received from a camera into a position on a map based on a conversion equation;
control a display to display the position of the object on the map based on results of the conversion;
set an existence allowed region of the object on the map, wherein the existence allowed region is set based on a user's designation of a region where the object exists on the map; and
determine a parameter of the conversion equation so that a trajectory of the object on the map falls within the set existence allowed region, wherein the determination is based on an evaluation, of the trajectory of the object, that indicates a location of the trajectory from a middle of the set existence allowed region, the results of the conversion at respective times within a period of time and the set existence allowed region of the object.

2. The information processing apparatus according to claim 1, wherein the circuitry is further configured to determine the parameter of the conversion equation based on a result of the conversion at the latest period and the set existence allowed region of the object at regular time intervals.

3. The information processing apparatus according to claim 1, wherein the circuitry is further configured to determine the parameter of the conversion equation so that the trajectory of the object on the map is located further away from a boundary of the set existence allowed region of the object.

4. The information processing apparatus according to claim 1, wherein the circuitry is further configured to determine the parameter of the conversion equation so that a speed at which the object moves on the map becomes constant.

5. The information processing apparatus according to claim 1, wherein, the circuitry is further configured to, based on an existence of a plurality of objects on the set existence allowed region, determine the trajectory of each of the plurality of objects on the map.

6. The information processing apparatus according to claim 1, wherein
the circuitry is further configured to extract the object from the image and obtain the position of the extracted object, wherein the extracted object is associated with a human.

7. The information processing apparatus according to claim 1, wherein the circuitry is further configured to set an initial value of the parameter of the conversion equation based on a user input value and a fixed value.

8. An information processing method, comprising:
converting a position of an object in an image received from a camera into a position on a map based on a conversion equation;
controlling a display to display the position of the object on the map based on results of the conversion;
setting an existence allowed region of the object on the map, wherein the existence allowed region is set based on a user's designation of a region where the object exists on the map; and
determining a parameter of the conversion equation so that a trajectory of the object on the map falls within the set existence allowed region, wherein the determination is based on an evaluation, of the trajectory of the object, that indicates a location of the trajectory from a middle of the set existence allowed region, the results of the conversion at respective times within a period of time and the set existence allowed region of the object.

9. A non-transitory computer-readable recording medium having stored thereon, computer-executable instructions that, when executed by a processor, cause a computer to perform operations, the operations comprising:
converting a position of an object in an image received from a camera into a position on a map based on a conversion equation;
controlling a display to display the position of the object on the map based on results of the conversion;
setting an existence allowed region of the object on the map, wherein the existence allowed region is set based on a user's designation of a region where the object exists on the map; and
determining a parameter of the conversion equation so that a trajectory of the object on the map falls within the set existence allowed region, wherein the determination is based on an evaluation, of the trajectory of the object, that indicates a location of the trajectory from a middle of the set existence allowed region, the results of the conversion at respective times within a period of time and the set existence allowed region of the object.

10. A surveillance camera system, comprising:
a surveillance camera; and
an information processing apparatus configured to process an image captured by the surveillance camera, wherein the information processing apparatus includes:
circuitry configured to:
convert a position of an object in an image received from the surveillance camera into a position on a map based on a conversion equation;
control a display to display the position of the object on the map based on results of the conversion;
set an existence allowed region of the object on the map, wherein the existence allowed region is set based on a user's designation of a region where the object exists on the map; and
determine a parameter of the conversion equation so that a trajectory of the object on the map falls within the set existence allowed region, wherein the determination is based on an evaluation, of the trajectory of the object, that indicates a location of the trajectory from a middle of the set existence allowed region, the results of the conversion at respective times within a period of time and the set existence allowed region of the object.

* * * * *